(12) United States Patent
Bhatia et al.

(10) Patent No.: US 8,041,780 B2
(45) Date of Patent: Oct. 18, 2011

(54) METHOD AND APPARATUS FOR DYNAMICALLY PUSHING CONTENT OVER WIRELESS NETWORKS

(75) Inventors: Randeep S. Bhatia, Somerset, NJ (US); Girija J. Narlikar, Basking Ridge, NJ (US); Sampath Rangarajan, Bridgewater, NJ (US); Ivica Rimac, Tinton Falls, NJ (US)

(73) Assignee: Alcatel Lucent, Paris (FR)

( * ) Notice: Subject to any disclaimer, the term of this patent is extended or adjusted under 35 U.S.C. 154(b) by 505 days.

(21) Appl. No.: 11/693,354

(22) Filed: Mar. 29, 2007

(65) Prior Publication Data
US 2008/0244040 A1    Oct. 2, 2008

(51) Int. Cl.
*G06F 15/16* (2006.01)
(52) U.S. Cl. .................... 709/219; 709/231
(58) Field of Classification Search .............. 709/227, 709/232, 236, 219, 231; 455/414.3, 417, 455/414.1, 456.5, 434, 456.6, 509, 418; 370/392, 370/328; 707/104.1; 379/242
See application file for complete search history.

(56) References Cited

U.S. PATENT DOCUMENTS

| | | | |
|---|---|---|---|
| 7,171,473 B1 * | 1/2007 | Eftis et al. ................. | 709/227 |
| 2002/0199209 A1 | 12/2002 | Shiga | |
| 2003/0012180 A1 | 1/2003 | Donahue et al. | |
| 2003/0093476 A1 | 5/2003 | Syed | |
| 2003/0095540 A1 | 5/2003 | Mulligan et al. | |
| 2003/0169704 A1 * | 9/2003 | Okanoue ................... | 370/328 |
| 2004/0031058 A1 | 2/2004 | Reisman | |
| 2004/0253996 A1 | 12/2004 | Chen et al. | |
| 2004/0260839 A1 | 12/2004 | Onoda et al. | |
| 2005/0009547 A1 * | 1/2005 | Harris et al. .................. | 455/509 |
| 2005/0027742 A1 * | 2/2005 | Eichstaedt et al. ......... | 707/104.1 |
| 2005/0198354 A1 * | 9/2005 | Holloway, Jr. ............... | 709/232 |
| 2006/0019679 A1 * | 1/2006 | Rappaport et al. ......... | 455/456.5 |
| 2006/0046699 A1 * | 3/2006 | Guyot et al. ............ | 455/414.1 |
| 2006/0135143 A1 * | 6/2006 | Suematsu .................... | 455/418 |
| 2006/1012655 | 6/2006 | Jiang et al. | |

(Continued)

FOREIGN PATENT DOCUMENTS
EP    1 853 045 A    11/2007
(Continued)

OTHER PUBLICATIONS
International Search Report and Written Opinion in PCT/US2008/003271, dated Aug. 14, 2008, 18 pages.

(Continued)

*Primary Examiner* — Jungwon Chang
(74) *Attorney, Agent, or Firm* — Wall + Tong, LLP (57) ABSTRACT

The invention includes a method and apparatus for dynamically pushing content over a wireless network A method includes obtaining network-level state information and user-level state information for a user in response to an indication that content is available for the user, determining whether a network-level condition is satisfied using the network-level state information, determining whether a user-level condition is satisfied using the user-level state information, and pushing the available content toward the user terminal of the user using the wireless network in response to the conditions being satisfied. The network-level state information includes cell utilization information for a cellular region associated with the user terminal of the user. The user-level state information includes at least one of a user channel quality, a user terminal power state, a user terminal battery power status, a user terminal memory status, at least one user terminal capability, and user subscription information for the user.

18 Claims, 5 Drawing Sheets

U.S. PATENT DOCUMENTS

| | | | |
|---|---|---|---|
| 2006/0171523 A1* | 8/2006 | Greenwell | 379/242 |
| 2006/0229065 A1* | 10/2006 | Lazaridis et al. | 455/414.3 |
| 2007/0032225 A1* | 2/2007 | Konicek et al. | 455/417 |
| 2007/0153820 A1 | 7/2007 | Gould | |
| 2007/0168523 A1 | 7/2007 | Jiang et al. | |
| 2007/0239884 A1* | 10/2007 | Karmakar et al. | 709/232 |
| 2007/0260744 A1* | 11/2007 | Shenfield | 709/236 |
| 2007/0286121 A1 | 12/2007 | Kolakowski et al. | |
| 2007/0287475 A1* | 12/2007 | Jeong et al. | 455/456.6 |
| 2008/0025307 A1* | 1/2008 | Preiss et al. | 370/392 |
| 2008/0101317 A1 | 5/2008 | Bouazizi | |
| 2009/0298496 A1* | 12/2009 | Pettersson et al. | 455/434 |

FOREIGN PATENT DOCUMENTS

| | | | |
|---|---|---|---|
| FR | 2 884 379 A | 10/2006 | |
| WO | WO 02/054174 A | 7/2002 | |
| WO | WO 2004/008789 | 1/2004 | |

OTHER PUBLICATIONS

Huang, Y-W et al.: "A bandwidth-sensitive update scheduling method for Internet push" May 26, 1998-May 29, 1998, May 26, 1998, pp. 303-310, XP010284011, p. 303, paragraph 1.Introduction-p. 304, paragrpah 1.Introduction.

PCT Search Report and Written Opinion corresponding PCT/US2008/003272, dated Mar. 13, 2008, Lucent Technologies Inc., Applicant.

* cited by examiner

METHOD AND APPARATUS FOR DYNAMICALLY PUSHING CONTENT OVER WIRELESS NETWORKS

FIELD OF THE INVENTION

The invention relates to the field of communication networks and, more specifically, to pushing content from content providers to wireless subscribers over wireless networks.

BACKGROUND OF THE INVENTION

Content providers provide content, such as text, images, audio, video, and the like, to wireless users over wireless networks. Content providers may provide content to wireless users either on-demand (e.g., in response to requests received from wireless users over the wireless network) or automatically (e.g., by pushing content to wireless users over the wireless network). While content pushing schemes generally alleviate many problems associated with providing content to users, such as eliminating setup/buffering latencies and disruptions during playback (e.g., due to network and channel conditions), existing content pushing schemes do not work well in wireless networks.

Disadvantageously, existing content pushing schemes utilize fixed schedules for pushing content to wireless users, thereby resulting in inefficient wireless network utilization and user terminal resource utilization. Specifically, at high push rates the bandwidth of other users may be adversely affected and at low push rates the user terminal battery is drained (due to the extended time during which content is pushed to the user terminal). Therefore, existing content pushing schemes negatively impact performance perceived by all wireless users (including wireless users registered for content push services, as well as wireless subscribers not registered for content push services).

SUMMARY OF THE INVENTION

Various deficiencies in the prior art are addressed through the invention of a method and apparatus for dynamically pushing content over a wireless network. A method includes obtaining network-level state information and user-level state information for a user in response to an indication that content is available for the user, determining whether a network-level condition is satisfied using the network-level state information, determining whether a user-level condition is satisfied using the user-level state information, and pushing the available content toward the user terminal of the user using the wireless network in response to the conditions being satisfied. The network-level state information includes cell utilization information for a cellular region associated with the user terminal of the user. The user-level state information includes at least one of a user channel quality, a user terminal power state, a user terminal battery power status, a user terminal memory status, at least one user terminal capability, and user subscription information for the user.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a user-centric, network-aware technique for dynamically pushing content to users over wireless networks. The present invention improves content pushes over wireless networks by dynamically pushing content to users according to changing network-level and user-level conditions. The present invention periodically re-evaluates network-level and user-level conditions, using associated network-level and user-level state information, in order to push content to users under desirable conditions (and to prevent content from being pushed to users under undesirable conditions), thereby improving network efficiency and, thus, providing improved performance perceived by all users (including users that subscribe to content push services as well as users that do not subscribe to content push services).

The present invention provides additional advantages for users that subscribe to content push services. By pushing content to users during desirable network conditions and terminal conditions, the present invention reduces terminal battery consumption. By pushing content to users prior to the scheduled/expected content viewing time, the present invention reduces the wait time experienced by the users when the users are ready to view the content and, further, improves the performance perceived by the users as the users review the content (because the content is streamed from the local storage of the user terminal, rather than being streamed from content servers over the wireless network).

Figure 1:
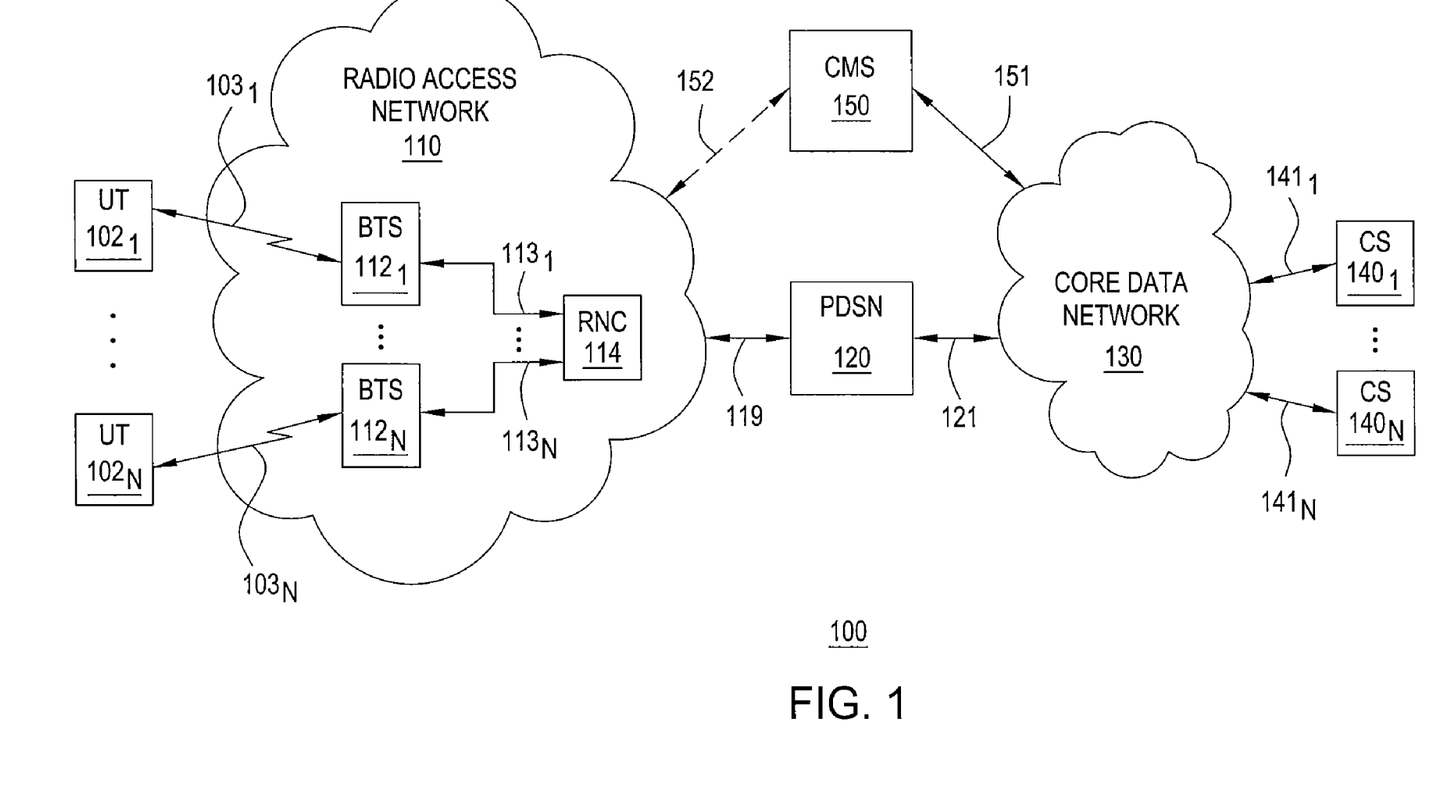
FIG. 1 depicts a high-level block diagram of a communication network.

FIG. 1 depicts a high-level block diagram of a communication network. Specifically, communication network 100 includes a plurality of user terminals (UTs) $102_1$-$102_N$ (collectively, UTs 102), a radio access network (RAN) 110, a packet data serving node (PDSN) 120, a core data network (CDN) 130, a plurality of content servers (CSs) $140_1$-$140_N$ (collectively, CSs 140), and a content management system (CMS) 150. The RAN 110 includes a plurality of base transceiver stations (BTSs) $112_1$-$112_N$ (collectively, BTSs 112) and a radio network controller (RNC) 114. As described herein, communication network 100 supports dynamic pushing of available content from CSs 140 to UTs 102.

As depicted in FIG. 1, UTs $102_1$-$102_N$ communicate with BTSs 112 using a plurality of wireless communication links (WCLs) $103_1$-$103_N$ (collectively, WCLs 103), respectively. The BTSs 112 provide radio interfaces for respective cellular regions (omitted for purposes of clarity). The BTSs $112_1$-$112_N$ communicate with RNC 114 using respective communication paths (CPs) $113_1$-$113_N$ (collectively, CPs 113). The PDSN 120 supports communication between RAN 110 and CDN 130 (illustratively, using a communication path (CP) 119 between RNC 114 and PDSN 120 and a communication path (CP) 121 between PDSN 120 and CDN 130). The CSs $140_1$-$140_N$ communicate with CDN 130 using a plurality of communication paths (CPs) $141_1$-$141_N$ (collectively, CPs 141). The CMS 150 communicates with CDN 130 using a communication path 151 (and, optionally, communicates with RAN 110 using a communication path 152).

The CSs 140 comprise content servers. The CSs 140 store content, such as text content, audio content, image content, video content, multimedia content, and the like, as well as various combinations thereof. For example, content stored by CSs 140 may include text-based information (e.g., news headlines, weather updates, stock quotes, and the like), audio clips, still images, animated images, video clips, multimedia clips, software updates, and the like, as well as various combinations thereof. The CSs 140 may stream real-time content received from other content sources. The CSs 140 may be maintained by various different content providers (e.g., service providers, businesses, organizations, and the like, as well as various combinations thereof). In one embodiment, CSs 140 may store service subscription information (e.g., indicating which content is subscribed to by which users).

The CSs 140 provide content to UTs 102. The CSs 140 may push content to UTs 102 directly using CDN 130 and RAN 110 in response to triggers from CMS 150. The CSs 140 may push content to UTs 102 indirectly by providing content to CMS 150 (which pushes the content to UTs 102 using RAN 110, and, optionally, CDN 130, depending on the implementation). The CSs 140 may provide content to UTs 102 using various different content formats depending on factors such as the type of content being provided, the quality of content being provided the quality-of-service with which the content is provided, the network implementation in which the content is provided (i.e., whether or not CMS 150 operates as a proxy for CSs 140), and the like, as well as various combinations thereof.

The CDN 130 supports communication of content from CSs 140 to RAN 110. For example, CDN 130 may be any network, e.g., a public data network, a private data network, and the like, as well as various combinations thereof. The PDSN 120 supports communications between CDN 130 and RAN 110 (i.e., operating as a connection point between CDN 130 and RAN 110). For example, PDSN 120 may manage Point-to-Point Protocol (PPP) sessions between CDN 130 and UTs 102. The RAN 110, including RNC 114 and BTSs 112, supports communications between CDN 130 and UTs 102. The UTs 102, BTSs 112, RNC 114, and PDSN 120, as well as other components, may store state information utilized by CMS 150 to dynamically push content from CSs 140 to UTs 102.

As depicted in FIG. 1, UTs 102 include wireless user terminals operable for communicating wirelessly. The UTs 102 receive wireless signals from BTSs 112 of RAN 110 using one or more downstream channels. The wireless signals received by UTs 102 may include information such as pushed content, requests for state information, and the like, as well as various combinations thereof. The UTs 102 transmit wireless signals to BTSs 112 of RAN 110 using one or more upstream channels. The wireless signals transmitted by UTs 102 may include information such as service subscription information, control information (e.g., state information and other control information), and the like, as well as various combinations thereof. For example, UTs 102 may include wireless user terminals such as mobile phones, personal digital assistants, and the like.

The UTs 102 receive pushed content over downstream wireless channels. The UTs 102 present received pushed content. The UTs 102 include one or more user interfaces (e.g., display screens, speakers, and the like) for presenting received pushed content to the user. The UTs 102 may process at least a portion of received pushed content for immediate presentation. The UTs 102 may store at least a portion of received pushed content for later presentation. The UTs 102 include one or more user interfaces (e.g., keypads, microphones, and the like) enabling associated users to subscribe to content push services, to interact with received pushed content (e.g., play the content, pause the content, etc.), and the like.

The UTs 102 transmit information over upstream wireless channels. The UTs 102 transmit service registration information upstream for storage in the network. The UTs 102 transmit state information upstream (for use by CMS 150 in dynamically pushing content to UTs 102). For example, UTs 102 may transmit user channel information, user terminal information, user information, and like information upstream. The UTs 102 may transmit state information upstream periodically (e.g., according to a schedule, in response to periodic requests, and the like), aperiodically (e.g., in response to requests from one or more network components), and the like, as well as various combinations thereof. The UTs 102 may transmit other information upstream.

As depicted in FIG. 1, communication network 100 is adapted for dynamically pushing content from CSs 140 to UTs 102. As described herein, CMS 150 dynamically pushes content from CSs 140 to UTs 102. The CMS 150 dynamically pushes content from CSs 140 to UTs 102 using state information obtained from various network components. Specifically, CMS 150 dynamically pushes content from CSs 140 to UTs 102 based on combinations of network-level state information and user-level state information obtained from one or more of CMS 150, CSs 140, PDSN 120, RNC 114, BTSs 112, and UTs 102 (or any other components from which such state information is available). The operation of CMS 150 in performing the dynamic content pushing functions of the present invention is depicted and described herein with respect to FIG. 1-FIG. 3.

The CMS 150 dynamically pushes content to UTs 102. The CMS 150 dynamically pushes content to UTs 102 by dynamically activating and deactivating content pushes to UTs 102. The CMS 150 dynamically activates and deactivates content pushes to UTs 102 by periodically evaluating one or more conditions for UTs 102 (or users) for which content is available. The CMS 150 evaluates conditions using state information. In one embodiment, CMS 150 periodically evaluates network-level conditions and/or user-level conditions using network-level state information and/or user-level state information. The operation of CMS 150 in dynamically pushing content to UTs 102 may be better understood with respect to FIG. 2 and FIG. 3.

The CMS 150 dynamically pushes content to UTs 102 by evaluating conditions using state information. The state information includes network-level state information and user-level state information. The network-level state information includes network status information. For example, the network-level information may include cell load information (i.e., an indication as to the current utilization of the cellular region with which the user terminal is associated), network resource utilization information, and the like, as well as various combinations thereof. The user-level state information includes information associated with the user channel (denoted as user channel information), information associated with the user terminal (denoted as user terminal information) and information associated with the user (denoted as user information).

The user channel information provides an indication of the quality of the user channel (e.g., user channel state information). The user terminal information may include terminal state information. The terminal state information may include one or more of a power state of the user terminal (e.g., whether the user terminal is in an active state or a dormant state), a battery status of the user terminal (e.g., an indication as to an amount of battery power available at the user terminal), a memory status of the user terminal (e.g., an indication as to an amount of storage space available at the user terminal), and the like, as well as various combinations thereof. The user terminal information may include terminal capability information identifying one or more terminal capabilities associated with the user terminal (e.g., content presentation capabilities and the like).

The user information includes user subscription information. The user subscription information may include any information specified by the user with respect to content push service(s) subscribed to by the user. The user subscription information may identify content subscribed to by the user, a level of quality of content subscribed to by the user, the quality-of-service with which content subscribed to by the user is to be pushed to the user, the time(s) at which the user plans to (or is expected to) review the content subscribed to by the user, and the like, as well as various combinations thereof. The user information may include user profile information. The user information may include any other information associated with the user.

The CMS 150 obtains state information for each user for which content becomes available to be pushed to the user. The CMS 150 continues to periodically obtain state information for each user for which content is available to be pushed to the user (i.e., as long as content is available to be pushed to a user, CMS 150 continuously re-evaluates conditions by which CMS 150 determines whether to activate or deactivate pushing the content to the user). In other words, CMS 150 periodically re-evaluates network-level conditions and user-level conditions, using associated network-level state information and user-level state information, in order to initiate/activate content pushes to users under desired conditions and prevent/deactivate content pushes to users under undesired conditions). The CMS 150 obtains state information from various sources.

In one embodiment, CMS 150 may obtain state information locally (i.e., state information stored within CMS 150). The state information may be stored on CMS 150 directly. For example, user profile information, subscription information, and the like may be stored and managed on CMS 150. The state information may be stored on CMS 150 indirectly. For example, state information stored on other components in the network is transferred to CMS 150 (e.g., automatically, in response to requests from CMS 150, and the like, as well as various combinations thereof).

In one embodiment, in which CMS 150 is implemented on one or more existing network components (e.g., on one or more of PDSN 120, RNC 114, BTSs 112, and the like; rather than being implemented as a standalone system), CMS 150 may obtain various other types of state information locally, depending on the network component(s) on which CMS 150 is implemented. For example, cell utilization information, user channel quality information, terminal state information, and the like, as well as various combinations thereof may be obtained locally, depending on the network component(s) on which CMS 150 is implemented. The implementation of CMS 150 on one or more existing network components is depicted and described herein with respect to FIG. 4.

The CMS 150 may obtain state information remotely from one or more network components (e.g., from one or more of PDSN 120, RNC 114, BTSs 112, UTs 102, and the like, as well as various combinations thereof). For example, CMS 150 may obtain cell load information from one or both of RNC 114 and BTSs 112 (from the BTS 112 serving UT 102 for the user for which content is available). For example, CMS 150 may obtain user channel quality information from one or more of RNC 114, BTSs 112 (from the BTS 114 serving the UT 102 for the user for which content is available), or UTs 102 (from the UT 102 for the user for which content is available). For example, CMS 150 may obtain at least a portion of the user terminal information (e.g., user terminal power state information, user terminal battery state information, user terminal memory state information, and the like) from the UT 102 for the user for which content is available.

The CMS 150 dynamically pushes content to UTs 102 by evaluating network-level conditions and user-level conditions using network-level state information and user-level state information for UTs 102. In one embodiment, dynamic pushing of content to a user may be represented as a dynamic content push schedule associated with the user. In one embodiment, dynamic content push schedules may be unstructured (i.e., each dynamic push schedule is an association of information includes one or more parameters according to which available content is to be pushed to the UT 102 for that user). In one embodiment, dynamic content push schedules may be structured. For example, structured dynamic content push schedules may include be stored as records including one or more fields including one or more parameters according to which available content is to be pushed to the UT 102 for that user.

The dynamic content push schedule for a user includes one or more parameters according to which available content is to be pushed to the UT 102 for that user. The dynamic content push schedule identifies the content that is to be pushed to the user. The dynamic content push schedule may include the time at which the identified content is to be pushed to the user (typically a time at which a determination is made that one or more conditions is satisfied such that available content should be pushed, or a time close thereto). The dynamic content push schedule may include a quality-of-service with which the identified content is to be pushed to the user. The dynamic content push schedule may include at least a portion of the state information used to evaluate conditions for determining whether to activate or deactivate content pushes. The dynamic content push schedule may include more or less information as required.

In one embodiment, dynamic content push schedules for users of UTs 102 may be used to prioritize dynamic content pushes to users if conditions are satisfactory for activating content pushes to multiple users (based on evaluation of network-level conditions and/or user-level conditions for each of the multiple users). For example, content pushes to multiple users may be prioritized based on respective times at which the users plan to (or are expected to) review the content, respective levels of service subscribed to by the users, respective qualities-of-service with which available content is to be pushed to the users, and like information, as well as various combinations thereof.

The CMS 150 dynamically pushes content to UTs 102 (and may be alternatively referred to herein as a content push server). The pushed content may include any content available from CSs 140 or other content sources. For example, pushed content may include one or more of text content, audio content, image content (including still and/or animated images), video content, multimedia content, and the like, as well as various combinations thereof. For example, pushed content may include news (e.g., news headlines, weather updates, stock quotes, and the like), audio clips, pictures, video clips, multimedia clips, software updates, and the like, as well as various combinations thereof. In other words, the pushed content may include any information which may be pushed to a user terminal over a wireless network.

The CMS 150 pushes content to UTs 102 (i.e., controls pushing of content to UTs 102). In one embodiment, CMS 150 pushes content to UTs 102 directly. In one such embodiment, CMS 150 downloads and stores content from one or more CSs 140 and pushes the stored content to UTs 102 (i.e., CMS 150 functions as a proxy/cache for CSs 140). In one embodiment, CMS 150 pushes content to UTs 102 indirectly. In one such embodiment, CMS 150 directs one or more of CSs 140 to push the content to UTs 102 (e.g., using request messages, trigger signals, or any other means of directing CSs 140 to activate content pushes to UTs 102.

In one embodiment, in which CMS 150 operates as a proxy for CSs 140, CMS 150 pushes content to UTs 102. In this embodiment, CSs 140 provide content to CMS 150 (which dynamically pushes the received content to UTs 102 using RAN 110 and, optionally, CDN 130). In one embodiment, one or more CSs 140 may provide content to CMS 150 when the content becomes available. In one embodiment, one or more CSs 140 may provide content to CMS 150 in response to requests for content received from CMS 150 (which may be triggered in response to notifications from CSs 140 to CMS 150 that content is available). The CSs 140 may provide content to CMS 150 in response to other requests, triggers, notifications, and the like, as well as various combinations thereof. The CSs 140 may provide content to CMS 150 using CDN 130 (and, depending on the implementation of CMS 150, using at least a portion of RAN 110).

In one embodiment, in which CMS 150 does not operate as a proxy for CSs 140, CSs 140 push content to UTs 102. In one embodiment, CSs 140 may push content to UTs 102 in response to requests/triggers received from CMS 150 (i.e., requests/triggers generated by CMS 150 based on evaluation of one or more conditions using associated state information). In one embodiment, CSs 140 may push content to UTs 102 using CDN 130 and RAN 110. In one embodiment, CSs 140 may push content to UTs 102 using one or more servers (omitted for purposes of clarity) disposed between CSs 140 and UTs 102 (e.g., disposed within CDN 130). The CSs 140 may push content to UTs 102 in response to other requests, triggers, notifications, and the like, as well as various combinations thereof.

Although primarily depicted and described herein within the context of a specific type of wireless network (illustratively, 3GPP-based EVDO or HSDPA wireless networks), the dynamic content pushing functions of the present invention may be implemented in various other types of wireless networks. For example, the dynamic content pushing functions of the present invention may be implemented in Universal Mobile Telecommunications System (UMTS) wireless networks, General Packet Radio Service (GPRS) wireless networks, and the like, as well as various combinations thereof. The present invention is not limited by the generation of wireless network (e.g., 2G, 2.5G, 3G, 4G, and the like, as well as various combinations thereof or the type of wireless network.

Since, as described herein, the present invention is not limited to implementation in 3GPP-based wireless networks, although primarily depicted and descried herein within the context of a 3GPP-based wireless network in which state information is available from BTSs, RNCs, and PDSNs, state information may be obtained from any network components from which such state information is available. For example, in UMTS and GPRS wireless networks, network-level state information and user-level state information may be obtained from Serving GPRS Support Node (SGSN) and/or GPRS Gateway Support Node (GGSN) components, although information available from such components may vary depending on wireless network type since such components often perform different functions in different types of wireless networks.

Figure 2:
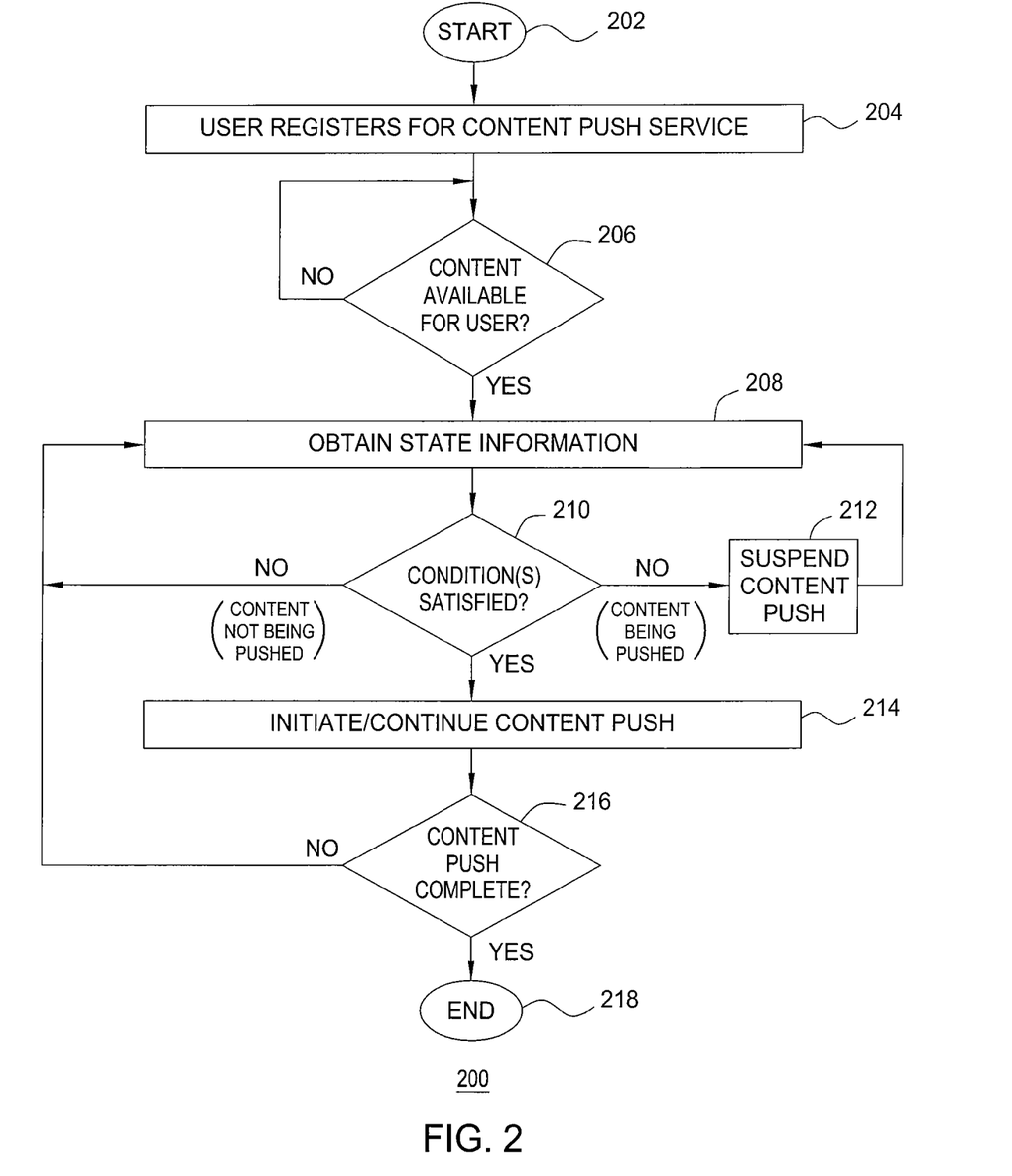
FIG. 2 depicts a method according to one embodiment of the present invention.

FIG. 2 depicts a method according to one embodiment of the present invention. Specifically, method 200 of FIG. 2 includes a method for dynamically pushing content to one user terminal. Although primarily depicted and described herein with respect to pushing content to one user terminal, method 200 may be repeated for each of a plurality of user terminals for which content is available (e.g., method 200 of FIG. 2 may be performed, for each of multiple users, within the context of method 300 of FIG. 3). Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, a user registers for a content push service. The user may register for the content push service using any service registration techniques. In one embodiment, the user may create a user profile. The user profile may include personal information associated with the user. The user profile may include user subscription information identifying the content that is to be pushed to the user (and/or types of content that the user may be interested in receiving), the time(s) at which the user plans to (or expects to) review the content, a quality-of-service with which the user expects the identified content to be pushed, and the like, as well as various combinations thereof. The user profile for a user is used to dynamically push content to the user (including dynamically initiating/activating and preventing/deactivating content pushes, as well as prioritizing content pushes for the user with respect to content pushes for other users).

The user profile may be created/modified by the user using a wireless user terminal (illustratively, the associated one of the UTs 102), a wireline user terminal (e.g., via a home computer, business computer, or any other means of accessing the user profile), and the like, as well as various combinations thereof. The user profile is stored in the network. In one embodiment, the user profile may be stored on a network component managing content push services (illustratively, CMS 150). In one embodiment, the user profile may be stored on one or more existing network devices storing user information (e.g., Home Location Registers (HLRs) maintained in the wireless network, one or more profile databases maintained in the core data network, and the like, as well as various combinations thereof).

At step 206, a determination is made as to whether content is available for the user. In one embodiment, the determination as to whether content is available for the user may be made by the content management system (illustratively, CMS 150). Although depicted and described as an explicit determination as to whether content is available for the user, in one embodiment the content management system controlling dynamic pushing of content may simply wait for an indication that content is available for the user. If content is not available for the user, method 200 remains within step 206 (i.e., method 200 remains within step 206 until an indication that content is available for the user is detected). If content is available for the user, method 200 proceeds to step 208.

In one embodiment, in which content intended for the user is provided from content servers to the content management system and stored on the content management system, the content management system may either detect that content is received from content servers or may periodically query local storage in order to determine whether content has been received from content servers. In one embodiment, the content management system may determine that content is available for the user by detecting content availability notifications received from content servers. In one embodiment, the content management system may determine that content is available for the user by periodically querying one or more content servers responsible for managing content to be pushed to the user (i.e., content which the user has registered to receive as part of the content push service).

At step 208, state information is obtained. The state information includes network-level state information and user-level state information. The network-level state information and user-level state information may include information such as cell load values, user channel quality values, user terminal power state values, user terminal battery values, user terminal memory values, user terminal capability information, and the like, as well as various combinations thereof. The state information may be obtained from one or more network components. The state information, as well as various sources of the state information and manner in which state information may be obtained, is described herein within the context of the communication network (i.e., with respect to FIG. 1).

At step 210, a determination is made as to whether a condition (or conditions) is satisfied. The determination as to whether the condition (or conditions) is satisfied is performed using the state information. The numbers of conditions evaluated, types of conditions evaluated, and requirements for determining whether conditions are satisfied may be predetermined. The conditions evaluated in order to determine whether or not to push content to a user terminal may include one or more of conditions associated with cell load, user channel quality, user terminal power state, user terminal battery power, user terminal memory space, user terminal capabilities, and the like, as well as various combinations thereof.

A first condition which may be evaluated is a cell utilization condition. In one embodiment, the cell utilization condition may be evaluated using a cell utilization value (determined from network-level state information) and a cell utilization threshold. The cell utilization value is indicative of a level of utilization (i.e., load) of wireless resources of the associated cellular region. In this embodiment, a cell utilization value less than the cell utilization threshold may be identified as satisfying the cell utilization condition, while a cell utilization value greater than the cell utilization threshold may be identified as failing to satisfy the cell utilization condition (e.g., because it is desirable to push content to users when the cell in which the user terminal communicates is not loaded, such that other users in the cell are not impacted by the content being pushed to that user).

A second condition which may be evaluated is a user channel quality condition. In one embodiment, the user channel quality condition may be evaluated using a user channel quality value (determined from user-level state information) and a user channel quality threshold. The user channel quality value is indicative of a level of quality of the user channel. In this embodiment, a user channel quality value greater than the user channel quality threshold may be identified as satisfying the user channel quality condition, while a user channel quality value less than the user channel quality threshold may be identified as failing to satisfy the user channel quality condition (e.g., because it is desirable to push content to users when the channel quality for that user is high, such that the content is delivered to the user terminal faster and, therefore, user terminal battery power is conserved).

A third condition which may be evaluated is a user terminal power state condition. In one embodiment, the user terminal power state condition may be evaluated using a user terminal power state value (determined from user-level state information). In one embodiment, two user terminal power state values may be supported, e.g., active and dormant. In one such embodiment, a user terminal power state value indicative that the user terminal is dormant may be identified as satisfying the user terminal state condition (e.g., where the content push should not interfere with other services utilized by the user). In another such embodiment, a user terminal state value indicative that the user terminal is active may be identified as satisfying the user terminal state condition (e.g., where the user terminal cannot receive pushed content while in a dormant state). In other embodiments, additional user terminal power state conditions may be supported.

A fourth condition which may be evaluated is a user terminal battery power condition. In one embodiment, the user terminal battery power condition may be evaluated using a user terminal battery power status value (determined from user-level state information) and a user terminal battery power threshold. The user terminal battery power status value is indicative of the amount of battery power available at the user terminal (or consumed by the user terminal). In this embodiment, a user terminal battery power status value greater than the user terminal battery power threshold (or less than, depending on what the value indicates) may be identified as satisfying the user terminal battery power condition, while a user terminal battery power status value less than the user terminal battery power threshold may be identified as failing to satisfy the user terminal battery power condition (e.g., because it is desirable to push content to users when there is sufficient battery power available at the user terminal such that the content push does not drain the battery).

A fifth condition which may be evaluated is a user terminal memory condition. In one embodiment, the user terminal memory condition may be evaluated using a user terminal memory status value (determined from user-level state information) and a user terminal memory threshold. The user terminal memory status value is indicative of the amount of memory space available at the user terminal (or consumed by the user terminal). In this embodiment, a user terminal memory status value greater than the user terminal memory threshold (or less than, depending on what the value indicates) may be identified as satisfying the user terminal memory condition, while a user terminal memory status value less than the user terminal memory threshold may be identified as failing to satisfy the user terminal memory condition (e.g., because it is desirable to push content to users when there is sufficient memory space available at the user terminal such that the pushed content can be stored).

A sixth condition which may be evaluated is a user terminal capability condition. In one embodiment, the user terminal capability condition may be evaluated using user terminal capability information (determined from user-level state information). In one such embodiment, where one or more specific user terminal capabilities is required in order for the user terminal to receive, process, or present available content, a determination may be made as to whether the user terminal supports such capabilities prior to pushing the content to the user terminal. For example, user terminal capabilities evaluated in order to determine whether the user terminal capability condition is satisfied may include a specific version of a software application, a specific screen size, and the like, as well as various combinations thereof.

Although primarily described with respect to evaluating conditions using a condition value and a condition threshold, each condition may be evaluated in any manner providing an indication as to whether that condition is satisfied for purposes of deciding whether to initiate/activate content pushes or prevent/deactivate content pushes. In one embodiment, conditions may be evaluated by comparing actual condition values with desired condition values. For example, for the terminal state condition, an actual terminal state value (i.e., whether the user terminal is active or dormant) may be compared to a desired terminal state value (e.g., content should only be pushed when the user terminal is active). In one embodiment, multiple condition values and associated condition thresholds may be evaluated in order to determine whether a condition is satisfied for purposes of deciding whether to initiate/activate content pushes or prevent/deactivate content pushes.

Although primarily described with respect to static determinations as to whether conditions are satisfied (e.g., for a given condition the same condition threshold, or other standard by which the given condition is evaluated, is used in all situations), in one embodiment, at least a portion of the evaluated conditions may be evaluated dynamically. In this embodiment, the requirement(s) according to which a condition is evaluated (i.e., standard(s) by which the determination as to whether a condition is satisfied is made, e.g., thresholds, specific values, and the like) may vary dynamically. For example, the standard(s) according to which a condition is evaluated may vary dynamically depending on one or more factors, such as underlying network technology, results from evaluation of other conditions, and the like, as well as various combinations thereof.

Although primarily described with respect to individual conditions, as described herein, multiple conditions may be evaluated in order to determine whether to initiate/activate content pushes or whether to prevent/deactivate content pushes. In one embodiment, for example, content is only pushed to a user when each of the cell load condition, the user channel quality condition, and one or more of the user terminal conditions is satisfied. Although primarily described herein with respect to evaluation of specific conditions, various other conditions may be evaluated in order to determine whether to initiate/activate content pushes or whether to prevent/deactivate content pushes.

If evaluated conditions are satisfied, method 200 proceeds to step 212. At step 212, pushing of content to the user terminal is initiated/re-activated (if content is not currently being pushed) or is continued (if content is currently being pushed). In one embodiment, all of the evaluated conditions must be satisfied in order for content to be pushed. For example, if five conditions are evaluated, a determination that all five evaluated conditions are satisfied may be required for a determination that the content may be pushed to the user. In another embodiment, a subset of the evaluated conditions must be satisfied in order for content to be pushed. For example, if five conditions are evaluated, a determination that at least three of the five evaluated conditions are satisfied may be sufficient for a determination that the content may be pushed to the user.

If evaluated conditions are not satisfied (and if content is not currently being pushed to the user terminal), method 200 returns to step 208, at which point updated state information is obtained for the user (possibly after a predetermined delay). If evaluated conditions are not satisfied (and if content is currently being pushed to the user terminal), method 200 proceeds to step 214, at which point pushing of content to the user terminal is suspended. From step 214, method 200 returns to step 208, at which point updated state information is obtained for the user. As described herein with respect to satisfied conditions (step 212), the number of unsatisfied conditions which prevents/deactivates content from being pushed to the user may vary (e.g., one unsatisfied condition is enough to prevent/deactivate content from being pushed, etc).

In other words, in one embodiment, pushing of content to a user terminal is initiated/activated in response to a determination that one or more evaluated conditions is satisfied, and pushing of content to a user terminal is prevented/suspended in response to a determination that one or more conditions is not satisfied. The determination as to whether the one or more conditions is satisfied or not satisfied is performed periodically using state information (e.g., network-level state information, user-level state information such as terminal state information and user state information, and the like, as well as various combinations thereof). In other words, the present invention dynamically activates and deactivates content pushes to user terminals in response to changing state information such that content pushes to user terminals are improved in terms of both network resources and terminal resources.

Figure 3:
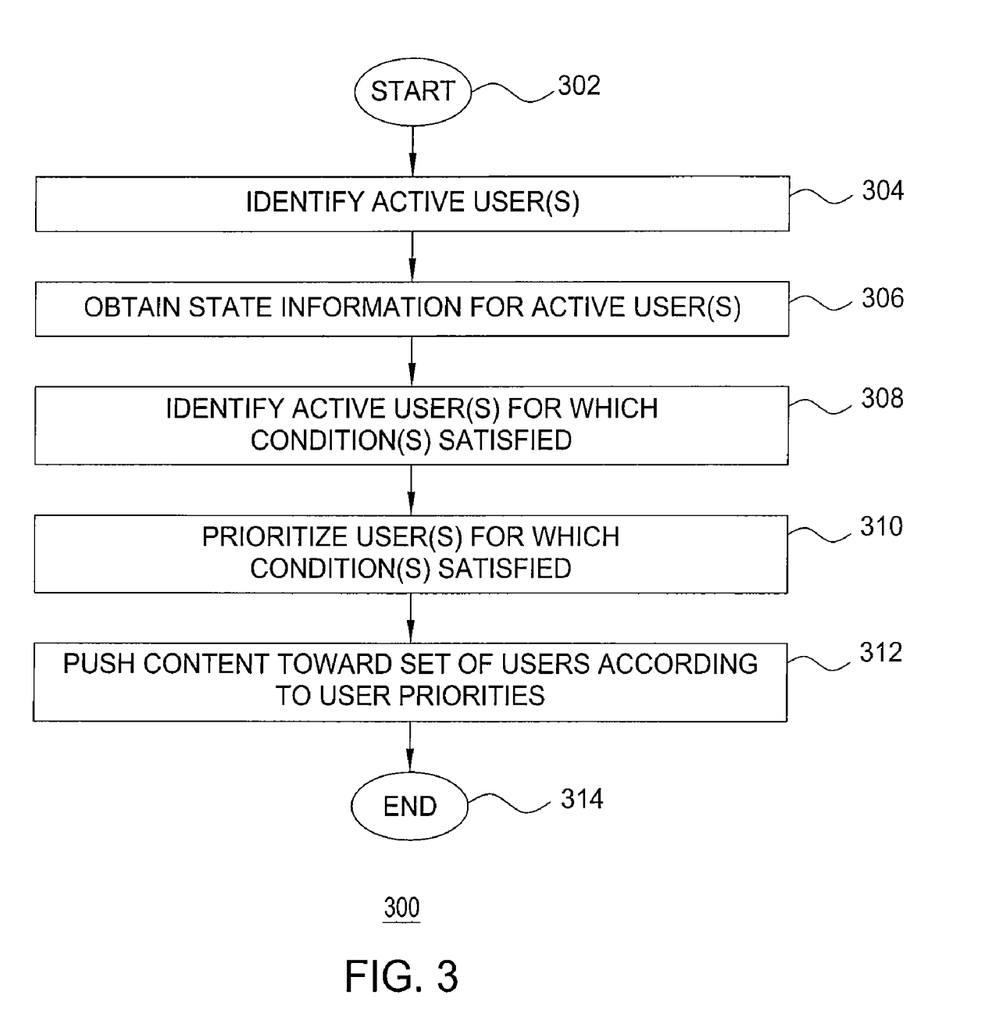
FIG. 3 depicts a method according to one embodiment of the present invention.

FIG. 3 depicts a method according to one embodiment of the present invention. Specifically, method 300 of FIG. 3 includes a method for pushing content to multiple user terminals. Although primarily depicted and described herein with respect to pushing content to multiple users terminals, at least a portion of method 200 of FIG. 2 may be performed for each of the multiple user terminals (within the context of method 300 of FIG. 3) in order to determine whether or not the user terminal is prioritized with respect to other user terminals. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, active users are identified. A user is considered active if content is available for the user. A user is considered inactive if content is not available for the user. A user switches from inactive to active in response to content becoming available for the user and switches from active to inactive in response to available content being delivered to the user (i.e., there is no additional content currently available for the user). At step 306, state information is obtained for each of the active users. The state information may be obtained for each active user as depicted and described herein with respect to FIG. 2. At step 308, each active user(s), for which one or more evaluated conditions is satisfied, is identified. For each active user, the one or more conditions are evaluated using the state information. The condition(s) may be evaluated for each active user as depicted and described herein with respect to FIG. 2.

At step 310, identified active users, for which one or more evaluated conditions is satisfied (i.e., evaluation of conditions indicates that conditions are satisfactory for pushing content to each of the active users), are prioritized. The prioritization of active users for which one or more evaluated condition is satisfied may be performed using various combinations of information. In one embodiment, prioritization of the users is performed using at least a portion of the state information. The prioritization of the users may be performed using at least a portion of the state information used for evaluating conditions for the active users. The prioritization of the users may be performed using other information not used for evaluating conditions for the active users.

In one embodiment, prioritization of the users is performed using user-level state information. The prioritization of the users may be performed using terminal state information. For example, users associated with dormant user terminals may be prioritized over users associated with active user terminals.

For example, users associated with user terminals having more available battery power (relative to other user terminals) may be prioritized over users associated with user terminals having less available batter power (relative to other user terminals). For example, users associated with user terminals having more available memory (relative to other user terminals) may be prioritized over users associated with user terminals having less available memory (relative to other user terminals). For example, users may be prioritized based on associated user terminal capabilities.

In one embodiment, prioritization of the users is performed using user subscription information associated with each of the users, such as times at which the respective users plan to review the content (or are expected to review the content), level of service subscribed to by each of the respective users, quality-of-service requested by each of the respective users, and the like, as well as various combinations thereof. For example, users planning to (or expected to) review the content sooner in time may be given priority over users planning to (or expected to) review the content later in time (relative to each other), such that the probability that content is delivered to a user in advance of when the user attempts to access the content is maximized. For example, users subscribed to a higher level of service may be given priority over users subscribed to a lower level of service (relative to each other).

At step 312, content is pushed toward a set of users according to the user priorities (i.e., according to the prioritization of active users for which one or more evaluated conditions is satisfied). The set of prioritized users to which content is pushed may include all prioritized users. The set of prioritized users to which content is pushed may include a subset of the prioritized users (and content available for users not included in the subset of prioritized users is not pushed, at least for the current round of processing).

In one embodiment, selection of the subset of prioritized users to which content is pushed may be performed according to the respective priorities of the prioritized users. In one embodiment, each prioritized user having a certain priority (e.g., prioritized users with priority levels above a priority threshold) may be selected for inclusion in the subset of prioritized users to which content is pushed. In one embodiment, a determination is made as to a number of prioritized users to include in the set of prioritized users to which content is pushed. For example, x number of highest priority users may be selected as the subset of prioritized users to which content is pushed. The number of users included in the subset of prioritized users to which content is pushed may be static or dynamic (e.g., different across evaluation periods).

In one embodiment, the number of users included in the subset of prioritized users to which content is pushed may be dynamically allocated according to various combinations of information such as state information associated with each of the users, as well as various other factors such as the number of prioritized users, the type of content available for each of the prioritized users, the quantity of content available for each of the prioritized users, the times at which each of the prioritized users are planning to (or expected to) review the content, a quality-of-service associated with each of the prioritized users, and the like, as well as various combinations thereof.

For example, the number of users included in the set of users to which content is pushed may be increased such that each user expected to review the content in the near future may be included in the set of users to which content is pushed. For example, the number of users included in the set of users to which content is pushed may be increased such that each user that subscribes to a high quality of service may be included in the set of users to which content is pushed. The number of users included in the set of users to which content is pushed may be dynamically increased and decreased according to various combinations of information.

At step 314, method 300 ends; however, although depicted and described as ending (for purposes of clarity), method 300 continues to operate in order to dynamically push content to users via the wireless network. As described herein, content availability for each of the users of the wireless network is continuously monitored such that one or more users may become active contemporaneously with any of the steps performed for active users. As further described herein, state information continues to be obtained for each user for which content is available (in order to periodically re-evaluate conditions in order to initiate/activate content pushes under desirable conditions and prevent/deactivate content pushes under undesirable conditions). In other words, various portions of method 300 may be performed in parallel for various sets of users in order to continuously optimize content pushes to users over the wireless network.

Figure 4:
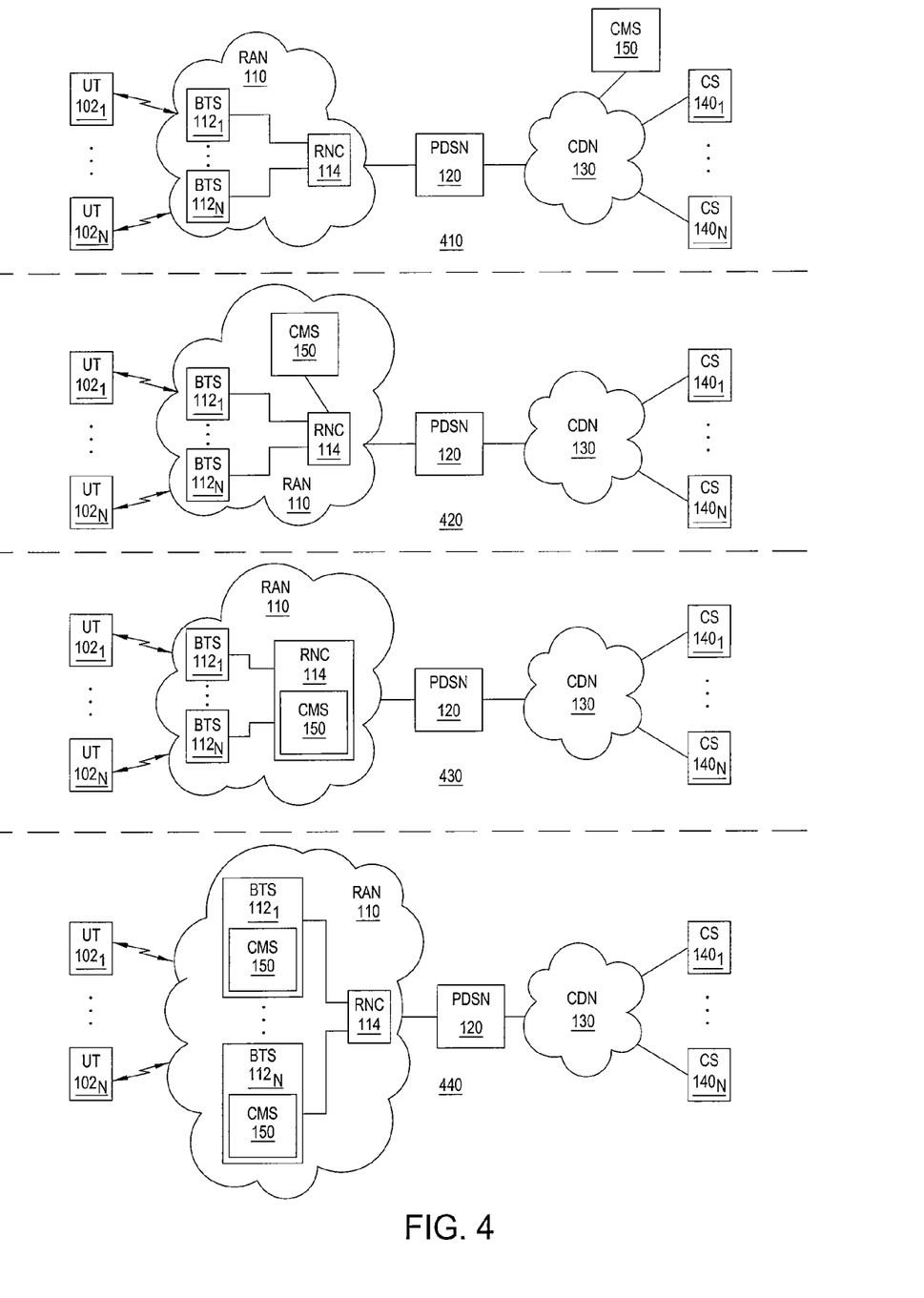
FIG. 4 depicts high-level block diagrams of exemplary implementation scenarios.

As depicted in FIG. 1, CMS 150 is depicted and described as being generally associated with communication network 100. Specifically, as depicted and described with respect to FIG. 1, CMS 150 is deployed as a standalone system in communication with RAN 110 and CDN 130. Although primarily depicted and described herein with respect to the deployment scenario of FIG. 1, various other implementation scenarios may be used in accordance with the present invention (some examples of which are depicted and described herein with respect to FIG. 4). FIG. 4 depicts high-level block diagrams of exemplary implementation scenarios (alternative scenarios for implementation of CMS 150 depicted and described herein with respect to FIG. 1).

As depicted in FIG. 4, in one embodiment (depicted as communication network 410 of FIG. 4) CMS 150 may be implemented within CDN 130. In one such embodiment, CMS 150 may be implemented as a standalone system hosted within CDN 130. In another such embodiment, CMS 150 may be co-located on one or more existing systems within CDN 130. In such embodiments, no changes are required to the existing network elements or existing standard by which such network elements operate, and issues such as user mobility/roaming are easily dealt with; however, other implementation scenarios depicted and described herein with respect to FIG. 4 may provide better network performance (including better backhaul resource utilization and better air link resource utilization) and user experience.

As depicted in FIG. 4, in one embodiment (depicted as communication network 420 of FIG. 4) CMS 150 may be implemented as a standalone system hosted within RAN 110 (receiving feedback from RAN 110). In such embodiments, content may be pushed to user terminals anywhere within the routing area, minimal changes are required to the existing network elements (e.g., BTSs 112 and RNC 114), and no changes are required to existing standards by which such network elements operate. Furthermore, in such embodiments, battery drain associated with user terminals receiving pushed content is minimized, impact on other user terminals is minimized, and overall network performance is improved (e.g., TCP performance may be enhanced using lower layer information, under-utilized backhaul resources are utilized, and other network performance improvements may be realized).

As depicted in FIG. 4, in one embodiment (depicted as communication network 430 of FIG. 4), CMS 150 may be implemented on RNC 114 of RAN 110 (as software and storage on RNC 114). In such embodiments, content may be pushed to user terminals anywhere within the routing area and, although changes are required to RNC 114, minimal changes are required to other existing network elements (e.g., BTSs 112) and no changes are required to existing standards by which such network elements operate. Furthermore, in such embodiments, battery drain associated with user terminals receiving pushed content is minimized, impact on other user terminals is minimized, and overall network performance is improved (e.g., TCP performance may be enhanced using lower layer information, under-utilized backhaul resources are utilized, and other network performance improvements may be realized).

As depicted in FIG. 4, in one embodiment (depicted as communication network 440 of FIG. 4), CMS 150 may be implemented on BTSs 112 of RAN 110 (as software and storage on BTSs 112). In such embodiments, optimum user experience is achieved (e.g., battery drain associated with user terminals receiving pushed content is minimized and impact on other user terminals is minimized by leveraging a finer granularity of state information) and overall network performance is improved; however, such embodiments may result in complex mobility management (e.g., the user may leave the cell before content is pushed.

Although depicted and described herein with respect to specific implementation scenarios, various other implementation scenarios may be utilized in accordance with the present invention. In some embodiments, CMS 150 may be implemented across multiple networks (e.g., a first portion of the functions of CMS 150 may be implemented within CDN 130 and a second portion of the functions of CMS 150 may be implemented within RAN 110). In some embodiments, CMS 150 may be implemented across multiple network components (both within and between networks). For example, in one embodiment, CMS 150 may be distributed across RNC 114 and BTSs 112 such that various combinations of software and storage required in support of the functions of CMS 150 is implemented across the different network components.

Figure 5:
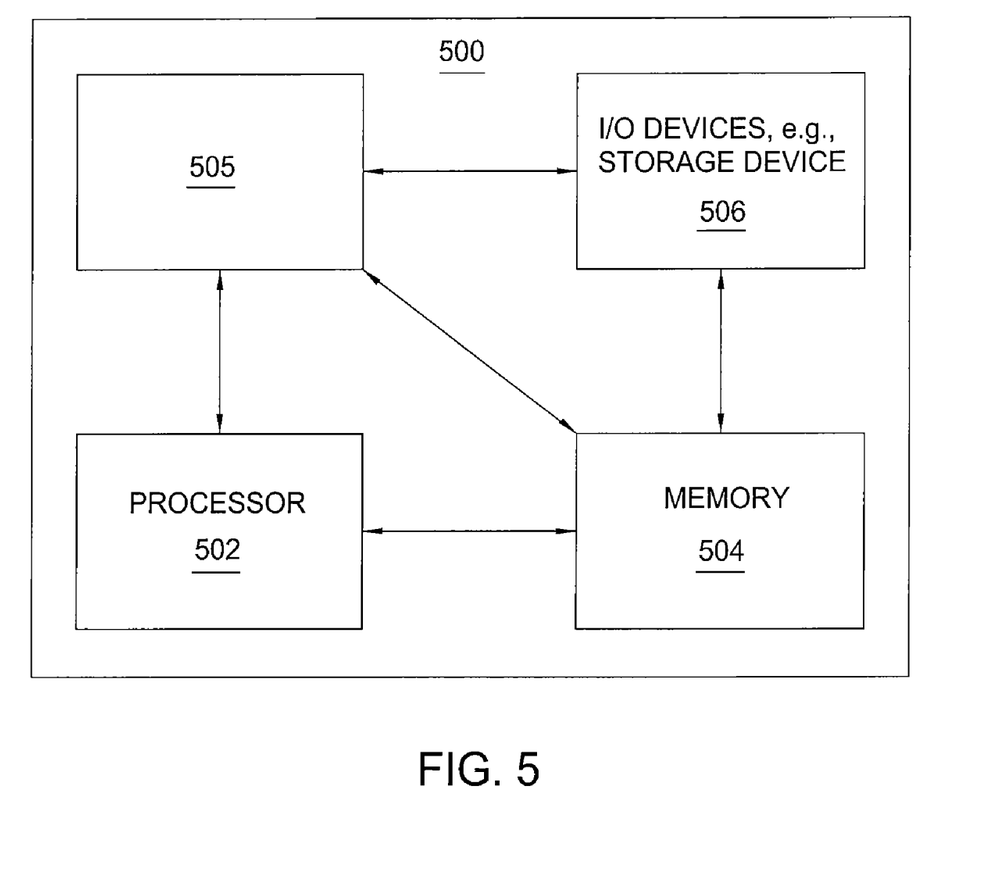
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), a content push scheduling module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present content push scheduling process 505 can be loaded into memory 504 and executed by processor 502 to implement the functions as discussed above. As such, content push scheduling process 505 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for dynamically pushing content toward a user terminal of a user over a wireless network, comprising:
a processor configured for:
obtaining state information for the user in response to an indication that content is available for the user,
determining, using a network-level state information, whether a network-level condition is satisfied;
determining, using the user-level state information, whether a user-level condition is satisfied;
initiating a push of the available content toward the user terminal of the user using the wireless network in response a determination that the conditions are satisfied;
suspending the push of the available content toward the user terminal in response to a determination that at least one of the conditions is no longer satisfied; and
resuming the push of the available content toward the user terminal in response to a determination that the at least one of the conditions that was no longer satisfied is re-satisfied;
wherein the determination that the at least one of the conditions that was no longer satisfied is re-satisfied is performed by continuing to monitor at least a portion of the state information while the content is being pushed toward the user terminal of the user.

2. The apparatus of claim 1, wherein the user-level state information comprises at least one of a user channel quality, a user terminal power state, a user terminal memory status, at least one user terminal capability, and user subscription information for the user.

3. The apparatus of claim 1, wherein determining whether the network-level condition is satisfied comprises:
determining whether a cell utilization condition is satisfied.

4. The apparatus of claim 1, wherein determining whether the user-level condition is satisfied comprises at least one of:
determining whether a user channel quality condition is satisfied;
determining whether a user terminal power state condition is satisfied;
determining whether a user terminal battery condition is satisfied;
determining whether a user terminal memory condition is satisfied; and
determining whether a user terminal capability condition is satisfied.

5. The apparatus of claim 1, wherein the determination that one of the conditions is no longer satisfied is performed by continuing to monitor at least a portion of the state information while the content is being pushed toward the user terminal of the user.

6. The apparatus of claim 1, wherein the processor is configured for:
suspending the push of the available content toward the user terminal in response to a determination that at least one of the conditions is no longer satisfied.

7. A method for dynamically pushing content toward a plurality of users over a wireless network, comprising:
- identifying active ones of the users, wherein the active ones of the users are users for which content is available;
- obtaining state information for each of the active users, wherein the state information comprises, for each of the active users, network-level state information and user-level state information;
- determining, for each of the active users, using associated network-level state information associated with the active user, whether a network-level condition is satisfied for that active user;
- determining, for each of the active users, using associated user-level state information associated with the active user, whether a user-level condition is satisfied for that active user;
- identifying, from among the active users, each active user for which at least one of the network-level condition of the active user is satisfied and the user-level condition of the active user is satisfied;
- prioritizing the identified ones of the active users; and
- pushing the available content, over a wireless network, toward at least a portion of the identified ones of the active users based on the prioritization of the identified ones of the active users.

8. The method of claim 7, wherein the network-level state information for an active user comprises cell utilization information for a cellular region associated with the user terminal of the active user, wherein the user-level state information for an active user comprises at least one of a user channel quality, a user terminal power state, a user terminal battery power status, a user terminal memory status, at least one user terminal capability, and user subscription information for the active user.

9. The method of claim 7, wherein prioritization is based at least in part on at least a portion of the state information associated with the identified ones of the active users.

10. The method of claim 7, wherein prioritizing the identified ones of the active users is performed using at least one of:
- for each of the identified ones of the active users, a content review time associated with the active user; and
- for each of the identified ones of the active users, a quality of service associated with the active user.

11. The method of claim 7, wherein the at least a portion of the identified ones of the active users toward which the available content is pushed are selected based on at least one of a priority threshold, a threshold number of users, a content type of the available content, a quantity of the available content, a plurality of content review times associated with the respective identified ones of the active users, and a plurality of quality of service indicators associated with the respective identified ones of the active users.

12. The method of claim 7, wherein the identified ones of the active users are active users for which both the network-level condition of the active user and the user-level condition of the active user are satisfied.

13. An apparatus for dynamically pushing content toward a plurality of users over a wireless network, comprising:
- a processor configured for:
  - identifying active ones of the users, wherein the active ones of the users are users for which content is available;
  - obtaining state information for each of the active users, wherein the state information comprises, for each of the active users, network-level state information and user-level state information;
  - determining, for each of the active users, using associated network-level state information associated with the active user, whether a network-level condition is satisfied for that active user;
  - determining, for each of the active users, using associated user-level state information associated with the active user, whether a user-level condition is satisfied for that active user;
  - identifying, from among the active users, each active user for which at least one of the network-level condition of the active user is satisfied and the user-level condition of the active user is satisfied;
  - prioritizing the identified ones of the active; and
  - pushing the available content, over a wireless network, toward at least a portion of the identified ones of the active users based on the prioritization of the identified ones of the active users.

14. The apparatus of claim 13, wherein the network-level state information for an active user comprises cell utilization information for a cellular region associated with the user terminal of the active user, wherein the user-level state information for an active user comprises at least one of a user channel quality, a user terminal power state, a user terminal battery power status, a user terminal memory status, at least one user terminal capability, and user subscription information for the active user.

15. The apparatus of claim 13, wherein prioritization is based at least in part on at least a portion of the state information associated with the identified ones of the active users.

16. The apparatus of claim 13, wherein prioritizing the identified ones of the active users is performed using at least one of:
- for each of the identified ones of the active users, a content review time associated with the active user; and
- for each of the identified ones of the active users, a quality of service associated with the active user.

17. The apparatus of claim 13, wherein the at least a portion of the identified ones of the active users toward which the available content is pushed are selected based on at least one of a priority threshold, a threshold number of users, a content type of the available content, a quantity of the available content, a plurality of content review times associated with the respective identified ones of the active users, and a plurality of quality of service indicators associated with the respective identified ones of the active users.

18. The apparatus of claim 13, wherein the identified ones of the active users are active users for which both the network-level condition of the active user and the user-level condition of the active user are satisfied.

* * * * *